(12) United States Patent
Everitt

(10) Patent No.: US 6,430,045 B1
(45) Date of Patent: Aug. 6, 2002

(54) COOLING RESISTOR BANKS

(75) Inventor: Alwyn John Everitt, Norfolk (GB)

(73) Assignee: Cressall Resistors Limited, Leicester (GB)

(*) Notice: Subject to any disclaimer, the term of this patent is extended or adjusted under 35 U.S.C. 154(b) by 0 days.

(21) Appl. No.: 09/868,890

(22) PCT Filed: Oct. 18, 2000

(86) PCT No.: PCT/GB00/03978

§ 371 (c)(1),
(2), (4) Date: Jan. 23, 2002

(87) PCT Pub. No.: WO01/31660

PCT Pub. Date: May 3, 2001

(30) Foreign Application Priority Data

Oct. 22, 1999 (GB) ............................................... 9924903

(51) Int. Cl.[7] ................................................. H05K 7/20
(52) U.S. Cl. ........................... 361/690; 338/53; 338/57; 338/58; 454/184; 188/264 F
(58) Field of Search ........................ 188/264 R, 264 A, 188/264 F; 303/124; 338/51–53, 57, 58; 454/184; 165/80.3; 174/15.1, 16.1; 361/678, 690, 692, 694, 703, 716

(56) References Cited

U.S. PATENT DOCUMENTS

| | | | | |
|---|---|---|---|---|
| 3,624,581 A | * | 11/1971 | Owen | 338/57 |
| 4,651,125 A | * | 3/1987 | Harkness | 338/295 |
| 4,847,585 A | * | 7/1989 | Kirilloff et al. | 338/58 |
| 4,901,138 A | * | 2/1990 | Kushibiki et al. | 257/721 |
| 5,877,674 A | * | 3/1999 | Berger, II | 338/315 |
| 6,081,183 A | * | 6/2000 | Mading et al. | 338/57 |

* cited by examiner

*Primary Examiner*—Gerald Tolin
(74) *Attorney, Agent, or Firm*—Haynes and Boone, LLP

(57) ABSTRACT

Resistor bank cooling apparatus 1 has an enclosure 2 surrounding a resistor bank 4. At least one first vane 6 directs into the enclosure 2 air flowing past an open side 12 thereof, which open side 12 is not a side facing the direction from which the air flowing past the enclosure 2 flows. The resistor bank 4 has a resistor element 22 which functions as at least one airflow directing baffle. The or each first vane 6 and the or each baffle are each disposed thereby to create an air flow through the enclosure 2 which achieves a sufficiently even cooling of the resistor bank 4. At least one second vane 60 to the side of the or each first vane 6 remote from the open side 12 captures and deflects into the enclosure 2 air which 'bounces off' the closed facing sides.

17 Claims, 5 Drawing Sheets

COOLING RESISTOR BANKS

The invention relates to resistor bank cooling apparatus of the type used for cooling dynamic braking resistor systems for traction vehicles.

Electric motor driven traction vehicles, such as trains, trams etc., are known to have two braking devices; a friction braking device comprising, for example, friction blocks or pads applied to the wheels or axles under the control of compressed air or hydraulics, and a dynamic braking device comprising a resistor system which is applied as an electrical load on the traction motor, thereby retarding its rotation.

Dynamic braking resistor systems are known to comprise a number of resistor banks each having a pair of supporting members with a resistor element held therebetween. The element may be constructed from several parts which may be joined together by welding and bent into a zig-zag shape. An electrical connection is made to each end of the element and insulating spacers isolate the element from the supporting members.

During a dynamic braking cycle, the rotational energy of the traction motor is largely dissipated in the resistor system as heat. As a result, the system gets hot, typically up to around 700° C., and each element requires cooling. Apart from the need to constrain the resistance value of the resistor element, which is temperature sensitive, traction vehicle dynamic braking systems are normally mounted under the vehicle, so cooling is required to prevent excessively raising the temperature of the space above, within the vehicle. Also, there are many other pieces of equipment mounted under the vehicle in the proximity of the resistor system which may be sensitive to heat.

Most commonly, cooling is achieved by air forced with fans past the resistor banks, through the spaces between the adjacent zig-zag legs of the elements. However, fans add additional moving parts to a vehicle which need to be incorporated along with all the other equipment mounted thereunder, where space may be at a premium, and increase the likelihood of a mechanical failure.

An alternative to forced air-cooling is natural air cooling where the resistor elements are subject to the airflows which result from the motion of the vehicle. However, when the elements are to be surrounded by an enclosure and the forward facing side of the enclosure is closed or substantially closed, achieving satisfactory natural air-cooling is not a straightforward matter. For instance, it has been found that if the elements are within an enclosure which has a closed forward facing side and an open bottom side, that is, the side facing the track, air flowing past the open side will not enter the enclosure but is drawn downwards as a result of a low pressure area that is created between the enclosure and the track. Nevertheless, adequately cooling the elements is not just a matter of getting air to enter the enclosure. It is also necessary to create an airflow through the enclosure which achieves a sufficiently even cooling of the elements.

To maximise the power dissipation capability of the resistor bank, it is desirable for the elements to operate at high temperatures. However, there are situations, for instance when resistor banks are used in traction vehicle dynamic braking systems, when the resistor banks are susceptible to the effects of inflammable litter, such as paper or dried leaves, which on contact with the elements are likely to ignite. Hence, because of the fire risk, it is desirable for the resistor elements not to operate at excessively high temperatures. Consequently, there is a trade off to be made. Optimum operating conditions are therefore selected to be a temperature slightly less than the ignition temperature of litter. This temperature must be maintained across all of the elements and hence the need for sufficiently even cooling.

Further difficulties arise if, for fear of over heating other under vehicle mounted equipment, the air carrying heat away from the elements cannot be expelled from the enclosure in line with the direction of travel of the vehicle, but has instead to be expelled to the side. It is necessary when expelling hot air to the side of a traction vehicle to guard against excessively raising the temperature of the sides of the vehicle, where there may be such temperature sensitive components as rubber door seals, and, bearing in mind that a traction vehicle is braked when pulling into a platform, to guard against scalding passengers standing on the platform.

The invention provides resistor bank cooling apparatus comprising an enclosure surrounding a resistor bank, air deflecting means for deflecting into the enclosure air flowing past an open side thereof, which open side is not a side facing the direction from which the air flowing past the enclosure flows, wherein the resistor bank has a resistor element which functions as at least one air flow directing baffle and wherein the air deflecting means and the or each baffle are each disposed thereby to create an air flow through the enclosure which achieves a sufficiently even cooling of the resistor bank.

Preferably, air is deflected by the air deflecting means thereby to draw into the enclosure further air flowing past the open side thereof. The air deflecting means may be at least partially below the open side. Further preferably, the air deflecting means comprises at least one first vane. The at least one first vane may be supported by parts, such as extension pieces to the sides of the enclosure, extending from the enclosure. At least one second vane may be supported to the side of the or each first vane remote from the open side. Such second vanes may help to deflect into the enclosure air which 'bounces off' the closed facing sides of the enclosure.

Also further preferably, the open side of the enclosure is the bottom, the direction of the air flowing past the enclosure is substantially parallel to the plane of the bottom, the or each first vane is at an angle with respect to the plane of the bottom and the or each baffle is at an angle with respect to a plane perpendicular to the plane of the bottom. In other words, the plane of each resistor element is inclined with respect to the plane of the bottom. Such inclination may be so as to ensure that a uniform distribution of airflow is achieved across the whole of the element by virtue of the proximity of each part of the element with respect to the point at which most air is deflected into the enclosure. Thus, the elements are inclined with regard to the positioning of the first vanes. In the case of apparatus mounted under a traction vehicle, the bottom is the side facing the track upon which the vehicle runs. Each vane may be curved in cross section so as to reduce fluidic shock.

The apparatus may further comprise a shaped wall within the enclosure which directs the air which has passed the resistor bank in a direction out of the enclosure which is substantially perpendicular to the direction of the air flowing past the enclosure. The direction out of the enclosure may also be substantially perpendicular to the direction of the air flowing past the resistor bank. In the case of apparatus mounted under a traction vehicle, the air may exit the enclosure to the side thereof, substantially perpendicular to the direction of motion of the vehicle.

The shaped wall may comprise a double skin and may serve as a radiant reflector. Apart from guiding hot air out of the enclosure and acting as a thermal barrier, the shaped wall may have a secondary role as a radiant reflector, particularly at high resistor temperatures. To maximise the rate at which radiant heat is reflected away from the resistor bank, there needs to be "optical co-ordination" between the shaped wall and the point at which air exits the enclosure. In other words, the energy has to be reflected by the shaped wall to a focus such that it is directed to the point at which the air passes exits the enclosure.

The apparatus may also comprise a generally downwardly directed nozzle through which air exits the enclosure. In the case of apparatus mounted under a traction vehicle, the air may exit at a height below the level of a platform at which the vehicle may stop, and directing the air downwards reduces the risk of scalding anyone standing on the platform and overheating the side of the vehicle.

Also further preferably, the air deflecting means comprises at least two sets of at least one first vane, each for directing air flowing in either one of two opposite directions past the enclosure. In the case of apparatus mounted under a bi-directional traction vehicle, having two sets of air deflecting means facilitates bi-directional cooling.

Each set of air deflecting means may comprise three first vanes, although the number of vanes may vary according to the size and requirements of the apparatus.

The apparatus may comprise a pair of resistor banks, one to either side of a common anchor axis, and each bank in a pair may be oppositely angled.

There may be a plurality of pairs of resistor banks.

The invention will now be described, by way of example, with respect to the following drawings in which.

Figure 1:
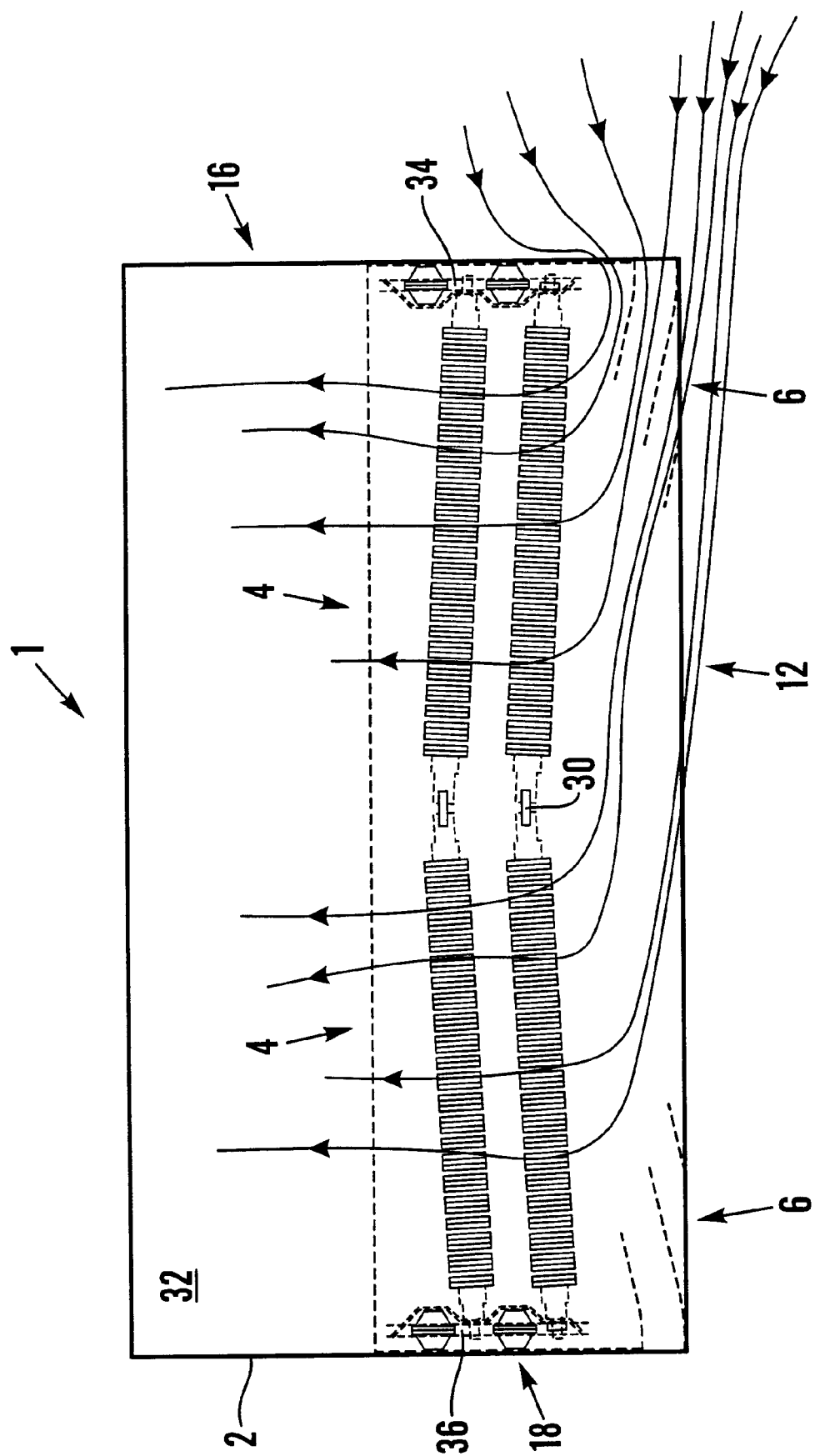
FIG. 1 is one side view of traction vehicle dynamic braking resistor cooling apparatus according to the invention, for under-vehicle mounting.
Figure 2:
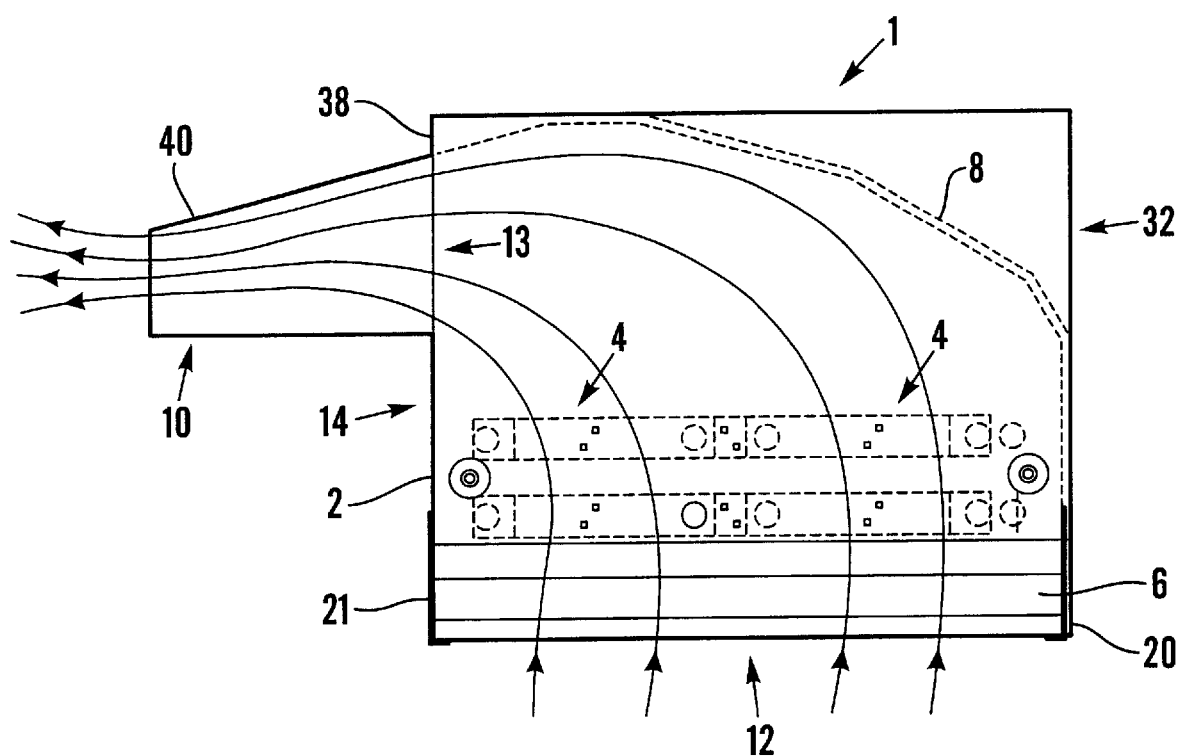
FIG. 2 is one end view of the apparatus shown in FIG. 1.
Figure 3:
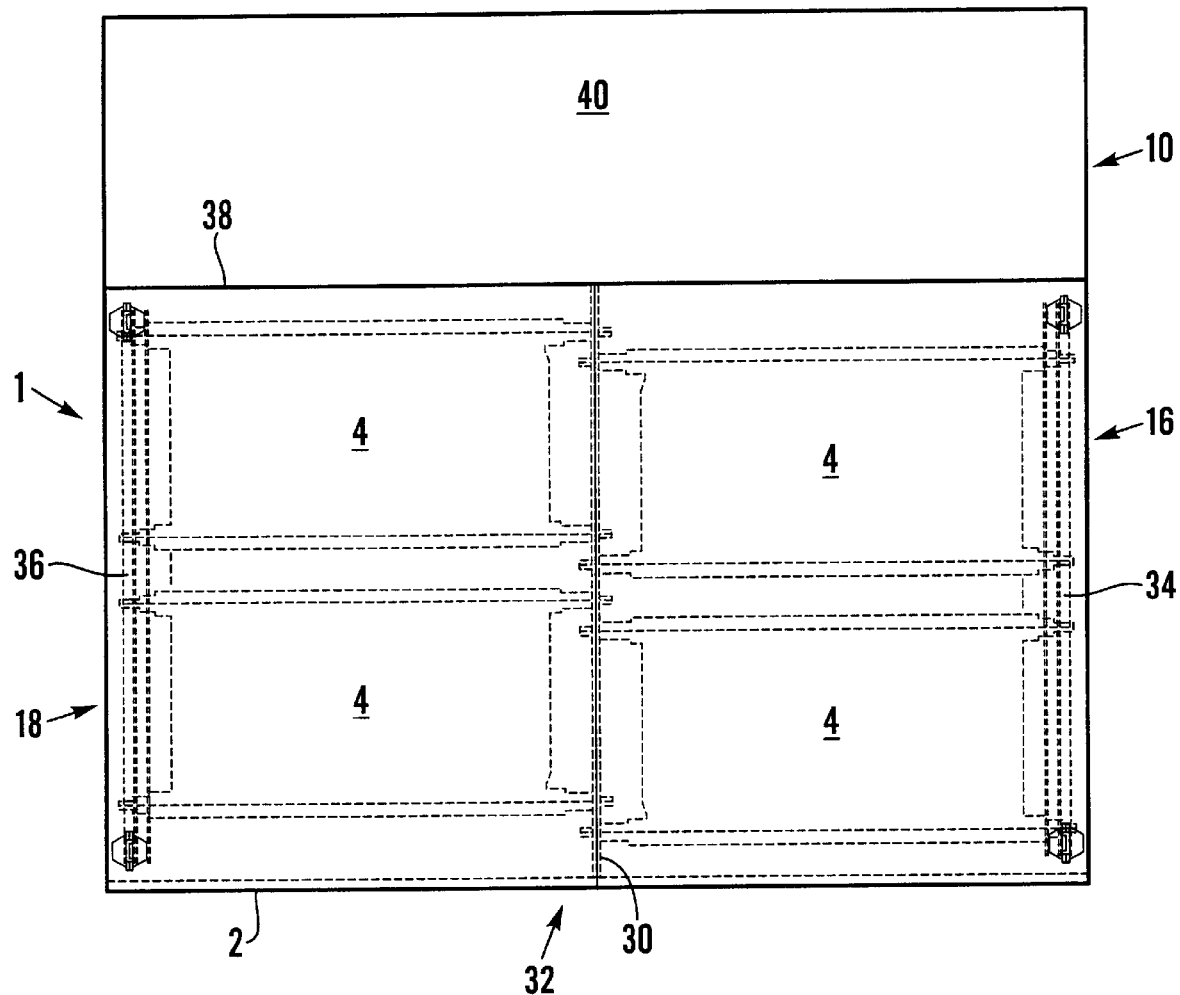
FIG. 3 is the top view of the apparatus shown in FIG. 1.
Figure 4:
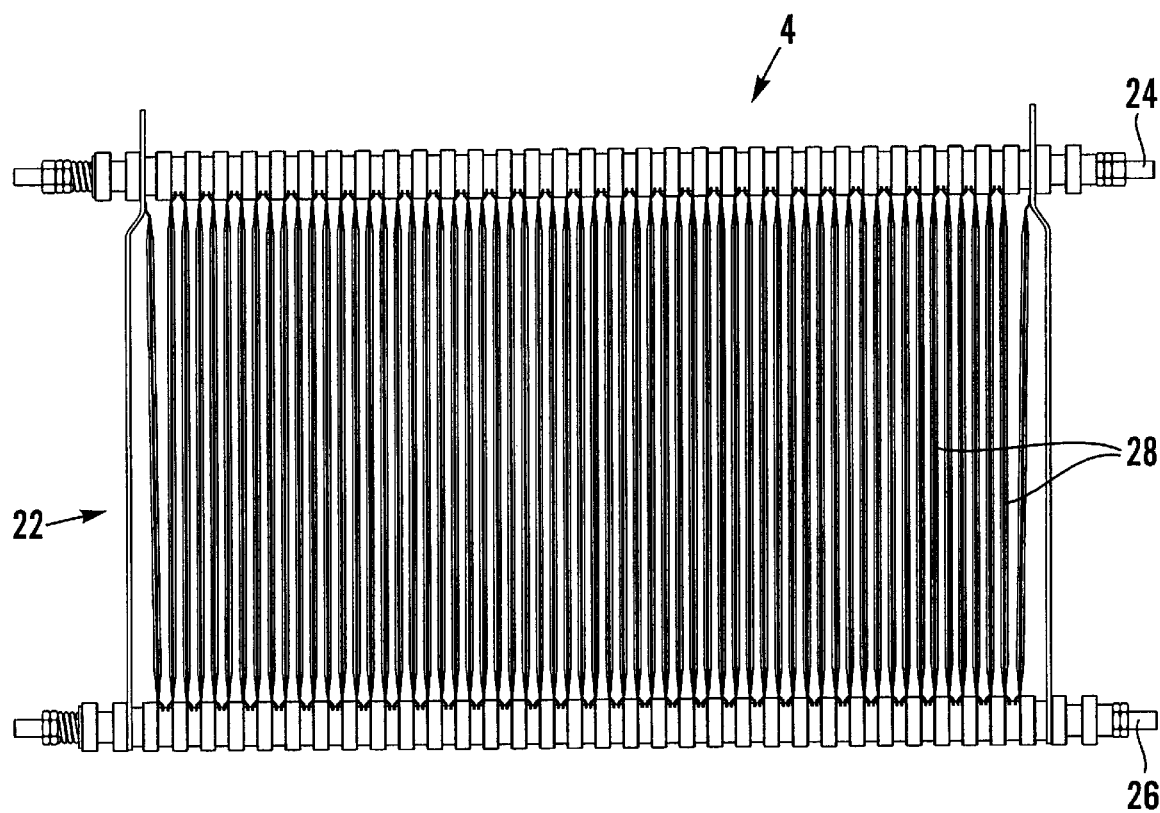
Figure 5:
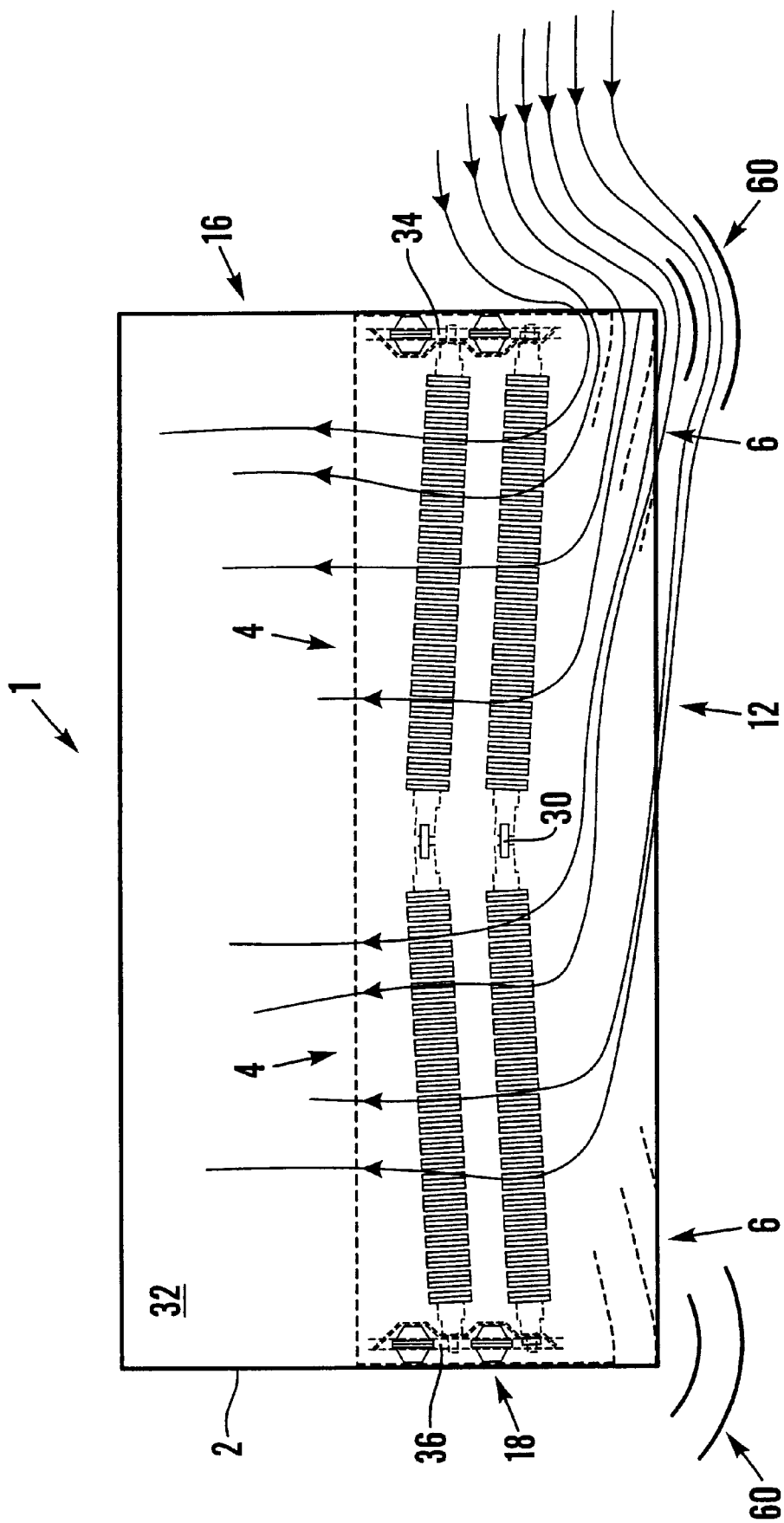

FIG. 4 is a side view of a resistor bank for use in a traction vehicle dynamic braking resistor system; and FIG. 5 is one side view of modified traction vehicle dynamic braking resistor cooling apparatus according to the invention With reference to FIGS. 1 to 3, indicated generally at 1 is resistor bank cooling apparatus comprising an enclosure 2, eight resistor banks 4 housed within the enclosure 2, air deflecting means constituted by two sets of three first air directing vanes 6 (shown in FIG. 1 with dotted lines), a shaped interior wall 8 to the enclosure 2 and an outlet nozzle 10.

The enclosure 2 consists essentially of a five sided, rectangular box, with all sides complete except for the bottom 12 which is open and one of the long sides 14 which has the nozzle 10 protruding from around an aperture 13. The enclosure 2 is intended for mounting underneath a bi-directional traction vehicle (not shown) with its short sides 16,18 each facing a direction of travel of the vehicle respectively and the nozzle 10 pointing substantially perpendicularly thereto. Attached at the bottom, long edge of each of the long sides 14, 32 are extension pieces 20, 21, which extend the length of the long sides 14, 32. The open bottom 12 is the side which faces the track (not shown) upon which the vehicle runs. Air flows past the enclosure 2 in a direction substantially parallel to the plane of the bottom 12 as a result of the motion of the vehicle. The extension pieces 20, 21 hang below the open bottom 12 and serve as opposed supports for the first air directing vanes 6.

Each of the first air directing vanes 6 in the two sets is of a rectangular, lamina form, although slightly curved in transverse cross section, and extends across the open bottom 12. Each first vane 6 is inclined at an angle with respect to the plane of the bottom 12 thereby to deflect a proportion of the air flowing past the bottom 12 upwards into the enclosure 2. Each set of first vanes 6 is intended for deflecting air flowing in one of two particular directions, according to the direction of motion of the vehicle. The set of first vanes 6 nearest each short side 16, 18 is for deflecting air flowing from the direction faced by the correspondingly nearest short side 16, 18. The other set of first vanes 6 are for when the vehicle is moving in the opposite direction. The slight curvature of each first vane 6 reduces the fluidic shock of air passing thereover, and assists in smoothing the passage of the air.

The first vanes 6 not only direct air into the enclosure 2 but, as a result of a lowering in pressure of the air deflected by the first vanes 6, also cause further air beyond the trailing edges of the first vane 6 to be drawn into the enclosure 2.

Each resistor bank 4 is selectively connected, when dynamic braking is required, to the traction motor (not shown) of the traction vehicle under which the enclosure 2 is mounted. Each bank 4 serves as part of the resistive load which is placed upon the traction motor to retard its motion and, because the energy of the motion is largely dissipated as heat, each resistor bank 4 requires cooling.

With reference also to FIG. 4, each of the eight resistor banks 4 comprises an element 22 made of resistor alloy which is held between two tie rods 24, 26. The element 22 of each resistor bank 4 is bent in a serpentine manner, back and forth between the two tie rods 24, 26. The element 22 is in the form of a strip, and each leg 28 between two consecutive bends in the strip is spaced apart from each adjacent leg 28 to allow air to flow therebetween to cool the element 22. Each leg 28 functions as an air directing baffle, and the plane of each leg 28 is substantially perpendicular to the plane of the resistor bank 4.

The resistor banks 4 are arranged in two layers each of four banks in two pairs. The banks 4 in each pair are each held at one end to a common anchor rod 30 which runs transversely across the enclosure 2, from one long side 14 to the other side 32, and at the other end to an individual anchor rod 34, 36 respectively adjacent the short side 16, 18 to which the relevant bank 4 extends.

The path of least resistance for the air which is diverted and drawn into the enclosure 2 is through the spaces between the baffle functioning legs 28 of the resistor elements 22, and the resistor elements 22 are thereby cooled. The baffle functioning legs 28 of each resistor element 22 affect the air flow through the enclosure 2 and are specifically disposed in combination with the vanes 6 to create an air flow which achieves sufficiently even cooling of the elements 22. Even cooling is maximised by positioning each of the resistor banks 4 in each pair at an angle with respect to the plane of the bottom 12 of the enclosure 2, with the end nearest the short side 16, 18 to which the bank 4 extends, the lower of the two ends of the bank 4. As a result, the baffle functioning legs 28 are disposed at an angle with respect to a plane perpendicular to the plane of the bottom 12. Each resistor bank 4 in each pair is oppositely angled, that is to say, taking the plane of the common anchor rod 30 as the plane of a mirror, each resistor bank 4 is angled in a mirror image fashion with respect to the other resistor bank 4 in the pair.

The air which has passed the baffle functioning legs 28 is directed by the shaped interior wall of the enclosure 2 towards the nozzle 10. The interior wall 8 extends from the long side 32 opposite the nozzle 10, from a level just above the upper of the two layers of resistor banks 4, to an upper edge 38 of the aperture 13. Although the interior wall 8 comprises a series of plane sections, it defines a generally curved path from the long side 32 to the other side 14 and thereby guides the airflow towards the nozzle 10. The generally curved path of the interior wall is continued by an upper wall 40 of the nozzle 10 so that air is expelled from the nozzle 10 generally downwards. The height at which the air is expelled is below the level of a platform (not shown) at which the vehicle may stop, and expelling downwards reduces the risk of anyone on the platform from being scalded and the side of the vehicle from becoming excessively hot.

The interior wall 8 has a double skin so as to insulate the space within the vehicle, above the apparatus 1, from the hot atmosphere within the enclosure 2. The inner skin may be fabricated from a radiant reflective material with the curvature arranged such that heat radiated from the elements 22 is reflected to a focus coincident with the nozzle 10.

Thus, the resistor banks are cooled by an airflow which is diverted, first of all, substantially perpendicularly to its incident direction and then substantially perpendicularly both to its diverted direction and to its incident direction.

With reference to FIG. 5, in a modification of the embodiment of the invention shown in FIG. 1, additional, second vanes 60 (shown schematically positioned in the figure) are provided externally of the enclosure 2, below the first vanes 6, to the remote side of the open bottom 12. These second vanes 60 assist airflow into the enclosure 2 by 'capturing' air which is re-directed by and 'bounces off' the facing short sides 16, 18 of the enclosure 2.

What is claimed is:

1. Resistor bank cooling apparatus comprising an enclosure surrounding a resistor bank, air deflecting means for deflecting into the enclosure air flowing past an open side thereof, which open side is not a side facing the direction from which the air flowing past the enclosure flows, wherein the resistor bank has a resistor element which functions as at least one air flow directing baffle and wherein the air deflecting means and the or each baffle are each disposed thereby to create an air flow through the enclosure which achieves a sufficiently even cooling of the resistor bank.

2. Apparatus according to claim 1 wherein air is deflected by the air deflecting means thereby to draw into the enclosure further air flowing past the open side thereof.

3. Apparatus according to claim 1 wherein the air deflecting means is below the open side.

4. Apparatus according to claim 1 wherein the air deflecting means comprises at least one first vane.

5. Apparatus according to claim 4 wherein the at least one first vane is supported by parts extending from the enclosure.

6. Apparatus according to claim 5 wherein at least one second vane is supported to the remote side of the or each first vane remote from the open side.

7. Apparatus according to claim 4 wherein the open side of the enclosure is the bottom, the direction of the air flowing past the enclosure is substantially parallel to the plane of the bottom, the or each first vane is at an angle with respect to the plane of the bottom and the or each baffle is at an angle with respect to a plane perpendicular to the plane of the bottom.

8. Apparatus according to claim 4 wherein the or each first vane is curved in cross-section.

9. Apparatus according to claim 1 further comprising a shaped wall within the enclosure which directs the air which has passed the resistor bank in a direction out of the enclosure which is substantially perpendicular to the direction of the air flowing past the enclosure.

10. Apparatus according to claim 9 wherein the direction in which the shaped wall directs the air out of the enclosure is substantially perpendicular to the direction of the air flowing past the resistor bank.

11. Apparatus according to claim 9 wherein the shaped wall comprises a double skin.

12. Apparatus according to claim 1 comprising a nozzle through which air exits the enclosure.

13. Apparatus according to claim 1 wherein the air deflecting means comprises at least two sets of at least one first vane, each for deflecting air flowing in either one of two opposite directions past the enclosure.

14. Apparatus according to claim 12 wherein there are three first vanes in each set.

15. Apparatus according to claim 1 comprising a pair of resistor banks, one to either side of a common anchor axis, and each bank in a pair is oppositely angled.

16. Apparatus according to claim 15 wherein there are a plurality of pairs of resistor banks.

17. A traction vehicle dynamic braking system comprising apparatus according to claim 1.

* * * * *